June 17, 1941.                O. B. SKONNORD                2,246,389
                         TIRE PRESSURE INDICATING SYSTEM
                              Filed May 20, 1940
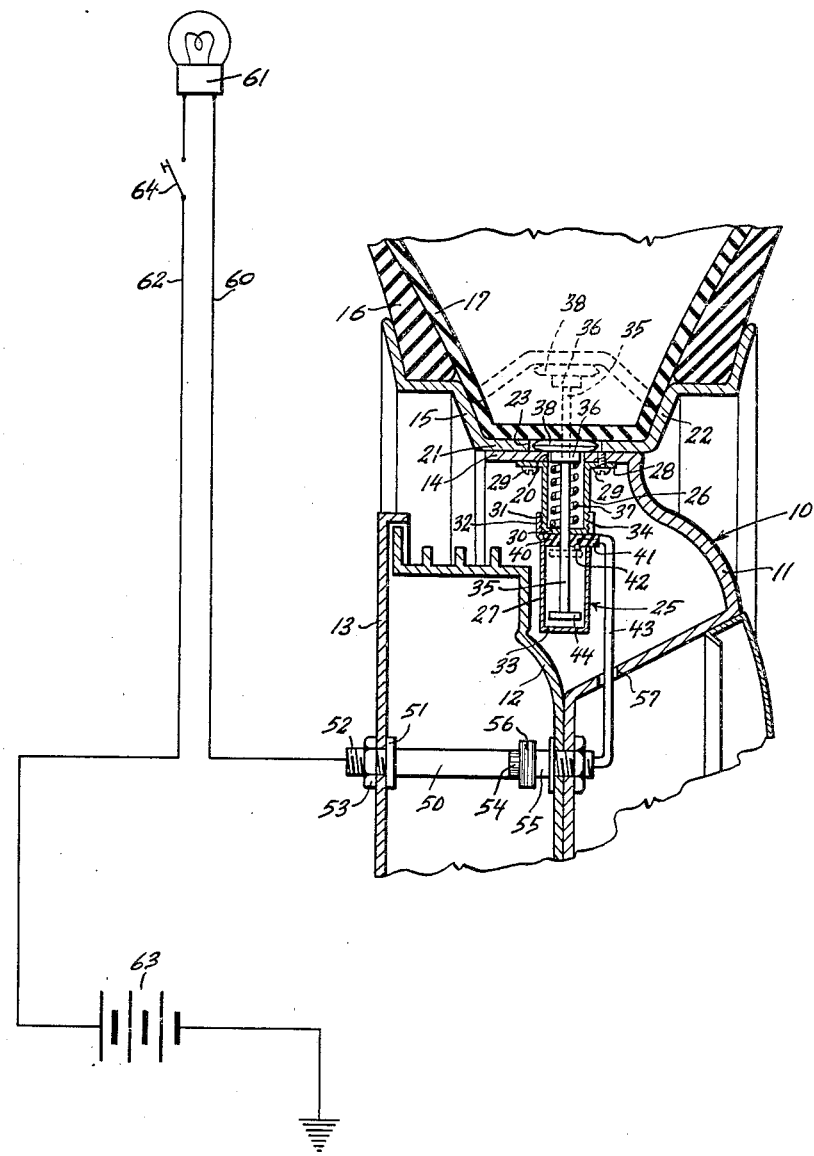
Olaf B. Skonnord
INVENTOR
BY Carl Miller
ATTORNEY Patented June 17, 1941

2,246,389

UNITED STATES PATENT OFFICE 2,246,389

TIRE PRESSURE INDICATING SYSTEM

Olaf B. Skonnord, Valley City, N. Dak.

Application May 20, 1940, Serial No. 336,233

1 Claim. (Cl. 200—58)

This invention relates generally to an electrical system for use on automotive vehicles for the purpose of indicating to the operator of the vehicle the degree of inflation of the tires, while the vehicle is in operation.

The primary object of this invention is to provide a device to be attached to an automobile wheel including a spring pressed plunger adapted to react against the inner tube of the tire and to close an electric circuit in accordance with a reduction in normal tire pressure, which device will not be affected by the speed of rotation of the wheel.

Another object of this invention is to include in the electric circuit a "make and break" contact means operative upon rotation of the wheel such as to cause intermittent flashing of a bulb on the vehicle dash.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein the single figure illustrates the invention applied to an automobile wheel equipped with a pneumatic tire and the electrical connections thereof.

Referring to the drawing, 10 denotes a conventional automobile wheel comprising a disc 11 having secured to the inner side thereof a brake drum 12 rotating in relation to a fixed brake backing plate 13. The disc 11 is formed to provide a peripheral flange 14 to which is secured the tire rim 15 shaped to receive a tire 16 and an inner tube 17 all in the manner well known.

Provided in the disc flange 14 at any suitable point thereon is an opening 20, and in registry therewith there is provided in the base 21 of the rim well 22 an opening 23 which is of a larger diameter than the disc flange opening 20, both openings being circular and in axial alignment.

Within the space defined between the brake drum 12 and the disc 11 there is positioned a casing 25 comprising a cylindrical upper casing member 26 and a lower cylindrical casing member 27. The upper casing member 26 is provided at its upper edge with an attaching flange 28 through which screw bolts 29 are inserted for mounting the casing 25 to the disc flange 14 in the manner clearly shown. Preferably the inside diameter of the upper casing member is equal to the diameter of the flange opening 20, with respect to which said casing member is axially dependent from. The upper casing member 26 is provided with an end wall 30 and the lower cylindrical wall portion of said casing member is threaded as at 31.

The lower casing member 27 is provided at its upper end with a cylindrical flange 32 internally threaded for threaded engagement with the threads 31 of the upper casing member 26 whereby to provide a detachable connection between both said casing members. The lower end of the lower casing member 27 is closed by an end wall 33, and formed at one side of the cylindrical flange 32 is a slot 34 running lengthwise of said casing member into the upper portion of the body thereof.

In the end wall 30 of the upper casing member 26 there is formed an axial opening through which is adapted to slidably extend the stem 35 of a plunger 36 fixed to the upper end thereof. A compression coil spring 37 is provided within the upper casing member 26 in surrounding relation to the stem 35, the upper end of the spring engaging the plunger 36 while the lower end of the spring is seated on the end wall 30. The plunger 36 normally seats in the flange opening 20 and has attached thereto in any desired manner an abutment head 38, which may or may not be formed as an integral part of said plunger, said head 38 normally seating in the rim opening 23.

Between the upper and lower casing members 26 and 27 there is clamped a circular insulating block 40 of rubber or any other insulating material provided with a radial extension 41 adapted to extend outwardly of the slot 34, the block 40 being clamped to the end wall 30. The block 40 is provided with an axial bore through which the stem 35 slidably extends into the lower casing member 27. Provided in the block 40 is a metallic contact button 42 projecting beyond the lower surface of said block, to which button there is connected one end of a conductor 43. By virtue of this construction the contact button 42 is insulated from the metal structure of the wheel and automobile body.

In the normal inward position of the stem 35 within the casing 25, the lower end thereof is adjacent the end wall 33 and has fitted thereto a contact disc 44 adapted to engage the contact button 42 when said stem is elevated under the action of the coil spring 37 as will be hereinafter described.

Attached to the brake backing plate 13 is a rod 50 which is positioned thereon at any suitable point and extends towards the brake drum 12 normal to said backing plate. The rod 50 is provided with a flange 51 and a threaded end 52 to be inserted through an opening in the backing plate 13 and is rigidly clamped thereto by setting up on the nut 53. On the inner end of the rod 50 there is suitably attached a contact head 54. Similarly connected to the disc 11 and brake drum 12 is a rod 55 having likewise suitably attached to its inner end a contact head 56. The contact head 56 is preferably of a larger size than the contact head 54 so as to insure a positive engagement therewith as the rod 55 is rotated with the brake drum. Obviously the rods 50 and 55 are of such length as to permit the engagement of the contact heads respectively carried thereby.

The conductor 43 is passed through an opening 57 in the disc 11 and is suitably connected to the rod 55. Similarly connected to the rod 50 is one end of a conductor 60, the other end of which is connected to one terminal of a light bulb 61 mounted on the vehicle dash. Another conductor 62 is connected at one end to the other terminal of the light bulb and at its other end to the battery 63. If desired a switch 64 may be provided in the conductor 62. The circuit is completed by grounding one side of the battery 63 to the metallic frame and by likewise grounding the contact button 42.

The operation of the device is as follows: When the tire 16 is properly inflated, the air pressure in the inner tube 17 will hold the plunger head 38 depressed against the action of the spring 37 so that the same will lie seated in its opening 23. In this position, with the switch 64 closed the circuit is nevertheless open as the contact disc 44 is out of engagement with the contact button 42. However, should the inner tube 17 become deflated to the extent indicated by the dotted lines, the reduction in air pressure will permit the spring 37 to elevate the plunger head 38 and stem 35 thus bringing the contact disc 44 into engagement with the contact button 42, thus grounding the same. When the contact heads 54 and 56 come into engagement once during each revolution of the wheel 10 the circuit is then completely closed and the light bulb will flash on. Repeated flashing on of the bulb 61 will indicate to the operator that the air pressure in the tire has fallen below a safe value.

It is to be understood that the invention may be applied to each of the wheels of an automobile and may be used in any type of vehicle employing pneumatic tires. It is especially useful when applied to the inner wheel of dual wheel units to insure that the same is not underinflated or losing air pressure.

Having thus set forth and disclosed the nature of this invention, what is claimed is:

A tire pressure actuated switch for a pneumatic tire equipped vehicle wheel having a rim and an inner tube within said tire directly engaging a portion of said rim when under normal operating tire pressure, a depending casing fixed to the underside of said rim, said casing comprising separable upper and lower casing parts, a plunger in said upper casing part arranged to contact said inner tube, spring means in said upper casing part acting on said plunger to elevate the same and being held compressed by virtue of the air pressure in said inner tube exerted thereby on said plunger, said plunger comprising a stem guided within said casing and extending into the lower casing part, an insulating washer surrounding said stem and clamped between the upper and lower casing parts, a contact button supported solely by said insulating washer, a contact disc on said stem, said contact disc being spaced from said contact button when said plunger is depressed and adapted to engage said contact button when said plunger is elevated to close an electric circuit.

OLAF B. SKONNORD.